Oct. 17, 1944.  J. MASIN  2,360,569
PERCOLATOR FOR COFFEE AND THE LIKE
Filed Nov. 21, 1941  3 Sheets-Sheet 1
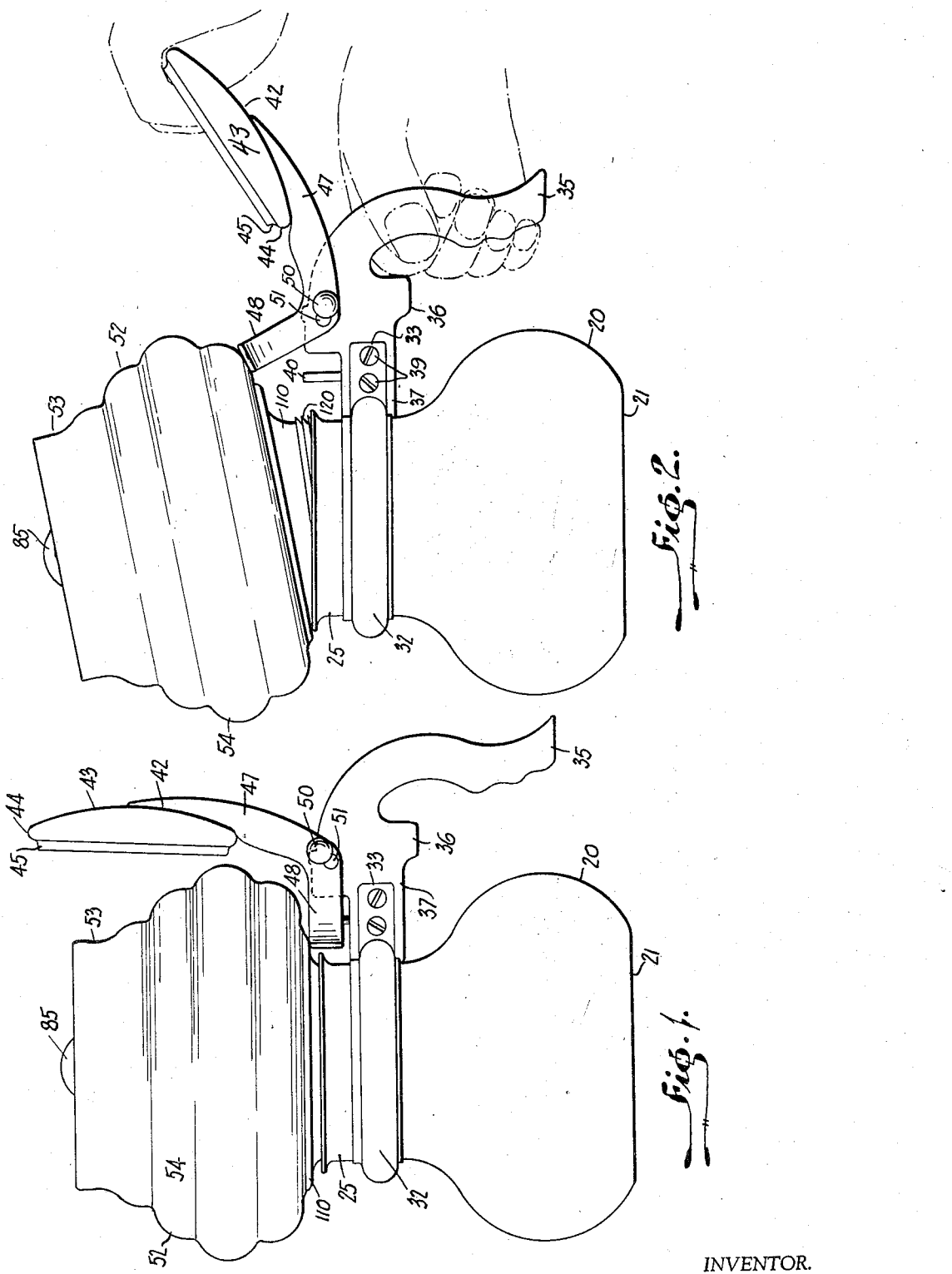
INVENTOR.
JOSEPH MASIN.
BY A. A. de Bonneville
atty

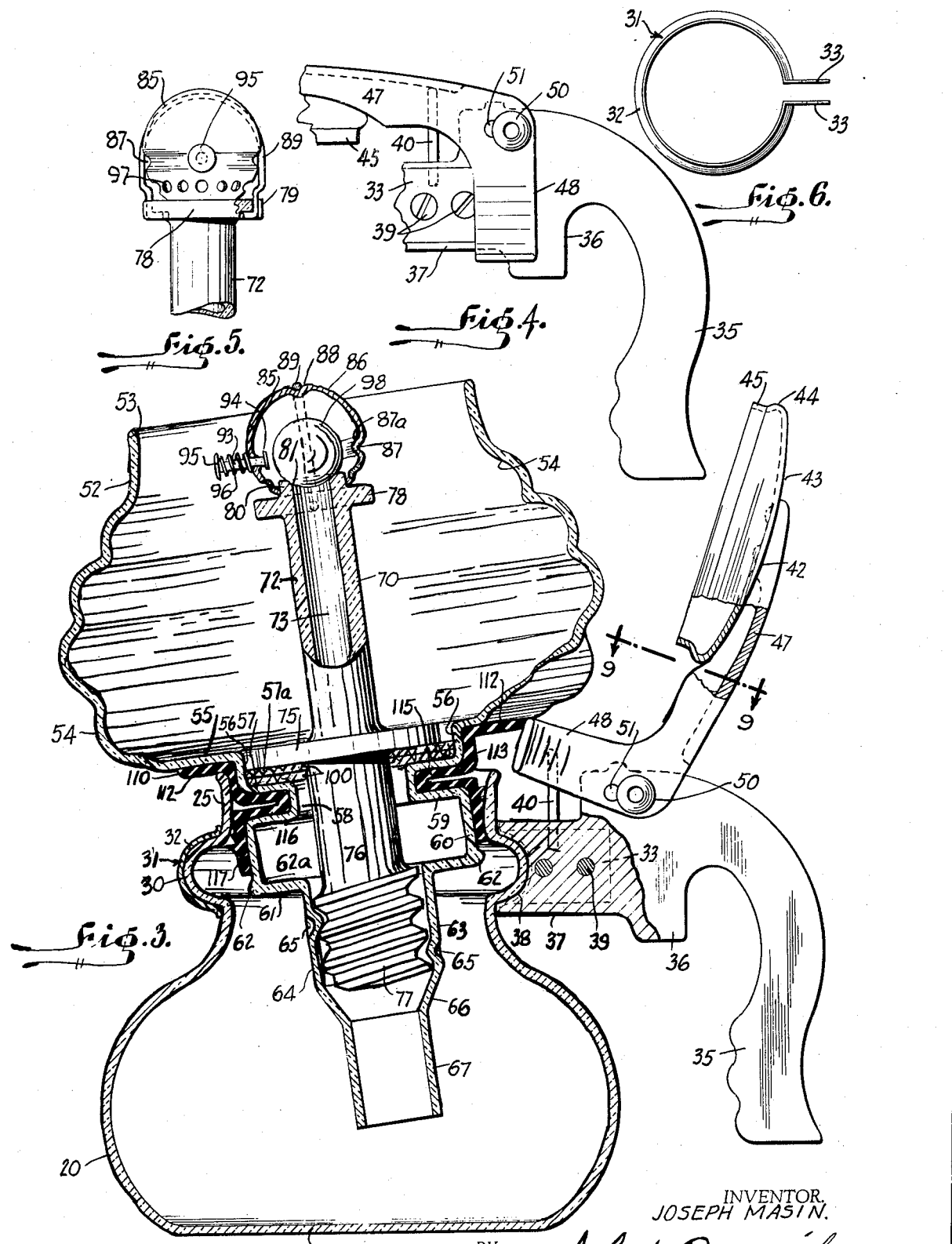

Oct. 17, 1944.  J. MASIN  2,360,569
PERCOLATOR FOR COFFEE AND THE LIKE
Filed Nov. 21, 1941  3 Sheets-Sheet 3
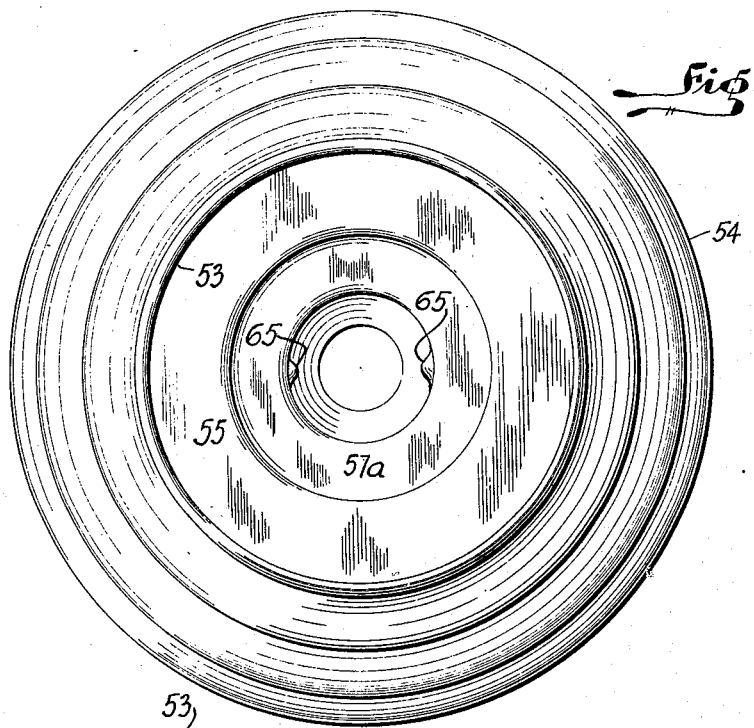
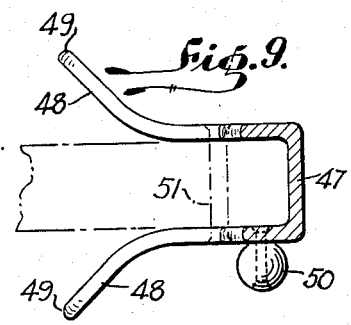
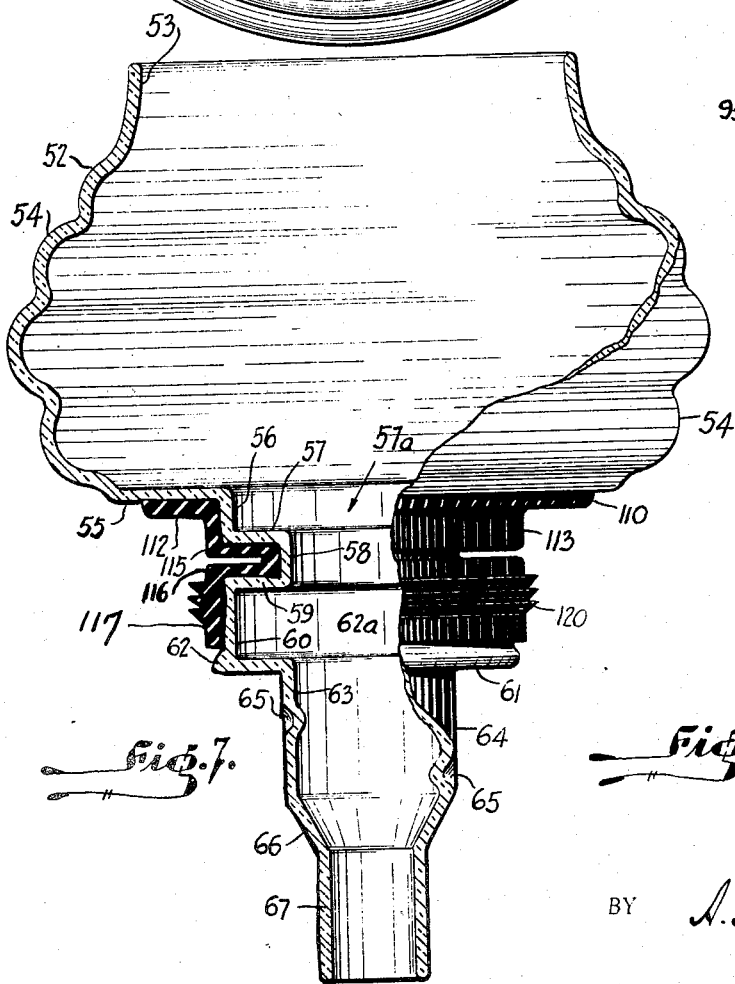
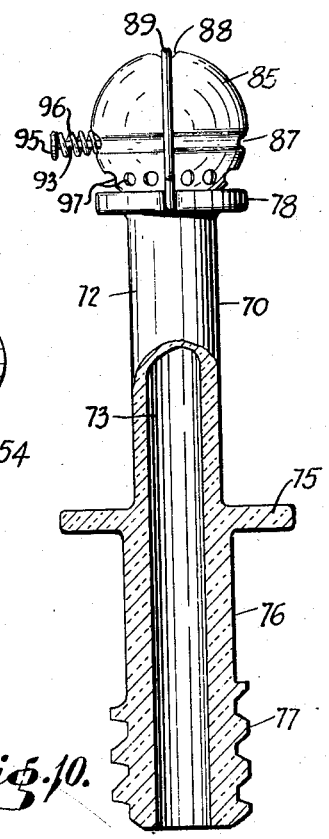
INVENTOR.
JOSEPH MASIN.
BY A. A de Bonneville
ATTORNEY.

Patented Oct. 17, 1944

2,360,569

UNITED STATES PATENT OFFICE 2,360,569

PERCOLATOR FOR COFFEE AND THE LIKE

Joseph Masin, New York, N. Y.

Application November 21, 1941, Serial No. 419,958

3 Claims. (Cl. 99—292)

This invention relates to a percolator for coffee and the like.

The object of the invention is the production of a percolator, by means of which filtered, clear coffee is made.

The second object of the invention is the production of the percolator constructed to avoid breaking its lower receptacle by excessive steam pressure.

The third object of the invention is the production of a percolator, in which the coffee grounds are evenly distributed in its upper receptacle, to prevent clogging of the coffee on its way to the lower receptacle.

The fourth object of the invention is the production of a percolator with means to easily separate the receptacles thereof and avoid breakage of the nozzle of the upper receptacle.

The fifth object of the invention is the production of a percolator with means to prevent burning the hands of the user, when pouring coffee out of the lower receptacle of the percolator.

The sixth object of the invention is the production of a percolator, the receptacles of which have interposed between them fins, which prevent the receptacles to be blown one from the other by excessive pressure in the lower receptacle and also to make an air tight means for the lower receptacle.

The seventh object of the invention is the production of a percolator with means to prevent the flowing of the coffee grounds and fluids from the upper receptacle.

Various other objects of the invention will be evident from the specification.

In the drawings Fig. 1 represents an elevation of the percolator in position for use; Fig. 2 is an elevation of the percolator in position to remove its top receptacle; Fig. 3, shows a longitudinal section of the percolator with portions in full lines and its upper receptacle in its tilted position; Fig. 4 shows an elevation of the handle of the percolator and its lifter and cover partly broken away; Fig. 5 indicates an elevation of the upper portion of the filter rod and its valve chamber; Fig. 6 is a top view of the clamping band on a reduced scale; Fig. 7 shows an elevation of the upper receptacle partly in section with a portion of the nozzle; Fig. 8 indicates a top view of Fig. 7; Fig. 9 shows a section of Fig. 3 on the line 9, 9; Fig. 10 is an elevation of the filter rod, partly in longitudinal section and its valve chamber.

The percolator comprises the lower bulb shaped receptacle 20, preferably of glass having the flat bottom 21, the large circular inlet nozzle 25 and the semi-circular supporting head 30.

A clamping band 31, preferably of metal, comprises the semi-cylindrical body portion 32, which latter has extending therefrom the parallel arms 33.

A handle 35, preferably of plastic material is shown with its upper guard 36, and the latter has the projecting portion 37 with the U shaped cut-out 38, integral therewith. Screws 39 connect the arms 33 and the portion 37 of the handle.

A stop pin 40 extends from the portion 37.

A cover for the receptacle 20 is indicated at 42 and comprises the hood shaped body portion 43, having the curved end 44 with the circular projection 45. The projection 45 is adapted to enter the circular inlet nozzle 25. A lifting arm for the cover 42 is indicated at 47 which has integral therewith the lifting members 48 with the curved ends 49, see Fig. 9.

A button 50 extends from one of the lifting members 48, to swing the cover 42, on the hinge pins 51.

The upper glass bulb shaped receptacle of the percolator is indicated in its entirety by the numeral 52. The said receptacle 52 is shown with the upper inlet end 53. The body portion of the receptacle 52 is indicated with the circumferential corrugations 54. The bottom wall of the receptacle 52 is indicated at 55.

From the wall 55 extends the longitudinal cylindrical wall 56, from which the supporting wall 57 extends forming the filter chamber 57a slightly below the wall 55. From the wall 57 extends the cylindrical wall 58 and from the latter extends the flat wall 59 at right angles thereto. A cylindrical wall 60 extends from the wall 59. A flat wall 61, with the extension 62 extends from the wall 60 and forms the lower chamber 62a.

A nozzle 63 extends from the wall 61 and comprises the barrel 64 having the indentations 65, the tapered portion 66 and the outlet portion 67.

A tubular filter rod 70 is shown with its upper portion in section.

The rod 70 comprises the upper cylindrical portion 72 with the inner longitudinal opening 73. An adjusting disc 75 extends from the cylindrical portion 72, and from the latter extends the cylindrical portion 76 somewhat larger in diameter than the portion 72. From the portion 76 extends the threaded lower end 77, which is engaged by the indentations 65. The lower end 77 is positioned in the barrel 64.

At the upper end of cylindrical portion 72 is indicated the flange 78, having a pair of diametrically opposite openings 79 which extend to the bottom of flange 78. A cylindrical projection 80 extends from the flange 78 with the spherical valve seat 81.

A spherical shaped discharge valve chamber 85 preferably of metal comprises the body portion 86, having the horizontal groove 87, forming a circular projection 87a in the valve chamber and the vertical groove 88. In the groove 88 is indicated a clamping wire 89 which extends to the openings 79, to detachably hold the valve chamber 85 in place.

A displacing rod 93 extends into the valve chamber 85 and is shown with the end flanges 94 and 95. A helical spring 96 is supported on the rod 93 between the wall of the valve chamber 85 and the flange 95.

A plurality of discharge openings 97 extend through the lower portion of the valve chamber 85.

A spherical valve 98 is indicated in the valve chamber 85, and is adapted to be seated on the spherical seat 81.

A pair of filter discs 100, are located in the chamber 57a, the lower one of which bears on the supporting wall 57, and the circumferential portions of the said discs bear against the circumferential wall of the said chamber 57a. The location of the filter discs prevent their being injured by the hot water and steam used for making the coffee to be described.

A rubber gasket is designated in its entirety by the numeral 110. The said gasket 110 comprises the upper annular flange 112, which bears against the wall 55 of the receptacle 52. The circular portion 113 extends from the flange 112 and encircles the cylindrical wall 56 of the chamber 57a. From the portion 113 extends the flat portion 115, which bears against the supporting wall 57. Below the portion 115 is shown the parallel portion 116, which bears against the wall 59 of the lower chamber 62a. From the portion 116 extends the circular longitudinal wall 117 which encircles the wall 60 of the lower chamber 62a.

Fins 120, see Fig. 7 extend from the wall 117, of the rubber gasket 110. Both the chambers 57a and 62a, are essential for mounting the rubber gasket 110 in place.

To use the percolator the members thereof are assembled as shown in Fig. 1. The operator then tilts the upper receptacle 52, by swinging the cover 42 to the position shown in Fig. 2. The upper receptacle 52 is then removed from the lower receptacle.

The filter rod 70 is next removed from the upper receptacle 52 and the filter discs 100 are positioned in the chamber 57a. The filter rod 70 is now located in place with its adjusting disc 75, bearing on the upper filter disc 100. The filter rod 70 is tightened in place by turning it, and its threaded lower end 77 engages the indentations 65 of the barrel 64.

Water is now poured into the lower receptacle 20 through the inlet nozzle 25.

Next the upper receptacle 52 is positioned in place upon the lower receptacle 20, and then the percolator is positioned with the bottom wall 21 of the receptacle 20, on a heater like an electric heater or gas stove and the like. Ground coffee is then dropped into the upper receptacle 52 through its inlet end 53, which covers the wall 55 and the disc 75, and is evenly distributed.

By virtue of this distribution of the coffee grounds as just described, clogging in the chamber 62a is avoided, and permits the coffee to easily enter the lower receptacle 20.

The water in the receptacle 20 when heated generates vapor which bears upon the water in said receptacle and forces the water up through the filter rod 70 and raises the spherical valve 98 from its seat 81.

Steam and water enters the valve chamber 85 from which the steam and water escapes through the openings 97 of said valve chamber, and enters the upper receptacle 52 and sprays upon the coffee grounds, preventing the latter flowing out of the upper receptacle 52.

By virtue of the construction of the filter rod 70, excessive steam pressure is avoided, as it only takes a pressure of about three ounces to raise the valve 98. The steam escapes through the openings 97 and the bursting of the lower receptacle is prevented. The operator now removes the percolator from the stove or heater, lowering the temperature therein, and the valve 98 drops to its seat and is guided by the projection 87a. A partial vacuum is produced in the lower receptacle 20. The said vacuum pulls the liquid coffee through the filter discs 100 into the lower receptacle, leaving the coffee grounds, oils and other foreign matter in the upper receptacle 52.

The operator now bears upon the flange 95 and thereby displaces the valve 98 from its seat, to permit air to enter the filter rod 70 through the openings 97, to enter the lower receptacle 20 and breaking the vacuum to easily separate the receptacles, and which prevents the breakage of the nozzle 63.

The adjusting disc 75 bearing upon the filter discs 100, produces an efficient filtration, producing a coffee clear of grounds and foreign matter.

The operator now swings the cover 42 to the position shown in Fig. 2. The ends 49 of the lifting members 48 are located to bear against the lower portion of the upper receptacle 52, and the latter is tilted as shown in Fig. 2, and overcomes the tension of the fins 120 of the rubber gasket 110, to easily separate the receptacles.

The operator now removes the upper receptacle 52 from the receptacle 20. The operator then swings down the cover 42 to close the lower receptacle to keep the coffee therein warm, see Fig. 4. When the cover 42 has been swung down as shown in said Fig. 4, the lifting arm 47 has become heated by the boiling water in the lower receptacle 20. The operator's hand when grasping the handle 35, is protected from being burnt by the guard 36, see Fig. 4.

When the cover 42 is swung down as just described, the stop pin 40 contacting with the arm 47, prevents injury to the glass inlet nozzle 25.

The coffee in the lower receptacle is now ready to be used.

Various modifications may be made in the invention and the present exemplification is to be taken as illustrative and not limitative thereof.

Having described my invention I claim.

1. In a percolator the combination of a lower receptacle and an upper receptacle, a chamber at the lower end of the upper receptacle, filter discs in said chamber, a tubular filter rod extending from the upper receptacle into the lower receptacle, an adjusting disc extending from the filter rod adapted to bear on the upper of said filter discs, means to vertically adjust said filter rod, a flange at the upper end of the filter rod, a projection extending from said flange and having a valve seat at its upper end, a spherical valve chamber detachably connected to said flange, the said projection extending into said valve chamber, a spherical valve in the valve chamber functioning with said valve seat, a displacing rod to displace the spherical valve from its seat to break the vacuum in the lower receptacle extending into the valve chamber and having end flanges and a helical spring supported on said rod and bearing between the valve chamber and the flange at the outer end of said rod.

2. In a wide neck glass type vacuum coffee maker, wherein a tube on the upper bowl extends into the lower bowl, and the upper bowl is firmly sealed to the lower bowl; said upper bowl having a double chamber on its lower end above the tube, underneath one another, the top of the lower chamber being joined to the bottom of the upper chamber by an inner flange thus providing a space between the chambers surrounding the flange, a filter bearing on the lower wall of the first or upper chamber, extending slightly into the bottom of the upper bowl, causing the coffee grounds to remain in the large area of the upper bowl and spreading and thinning the grounds; and preventing entering and clogging in either chamber.

3. In a glass type vacuum coffee maker wherein a tube on the upper bowl extends into the lower bowl and the upper bowl is firmly sealed to the lower bowl, the combination of a handle for the lower bowl, a lid for the lower bowl pivoted on the handle, the lid pivoting means comprising an angular member having two depending arms straddling the handle, the member being operable to swing the arms into engagement with the bottom of the upper bowl to tilt same on the lower bowl.

JOSEPH MASIN.